Dec. 23, 1941.    W. BUSCHBECK    2,267,371
FEEDER NETWORK
Filed March 12, 1938
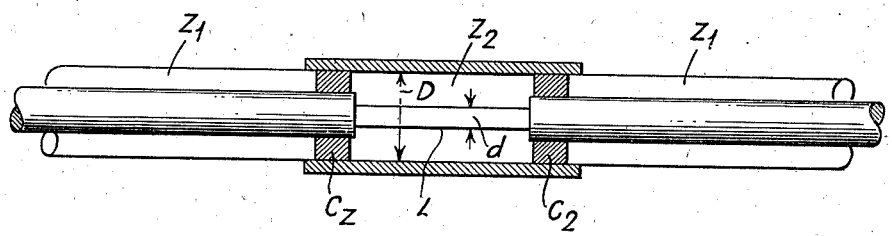
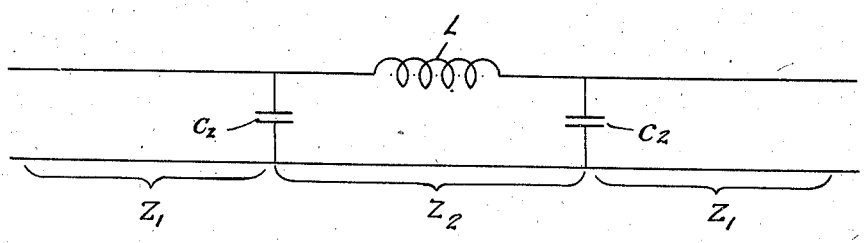
INVENTOR
WERNER BUSCHBECK
BY
ATTORNEY Patented Dec. 23, 1941

2,267,371

UNITED STATES PATENT OFFICE 2,267,371

FEEDER NETWORK

Werner Buschbeck, Berlin, Germany, assignor to Telefunken Gesellschaft für Drahtlose Telegraphie m. b. H., Berlin, Germany, a corporation of Germany Application March 12, 1938, Serial No. 195,479
In Germany March 13, 1937

4 Claims. (Cl. 178—44)

In the operation of radio frequency feeder lines or cables of more than average length which are required to be worked always in the presence of proper adaptation, faulty adaptation or matching arising and observed only in the line is often occasioned by joints, change-over switches, expansion members, or the like. This is due to local variations of the characteristic impedance occurring, for instance, in a diminishing sense owing to an increase in shunt capacitance inherent in additional insulators such as cable heads, supporting insulators on pivots or the like, or in an increasing sense, owing to curves of a small radius of curvature causing a unilateral displacement of the current.

Such faulty matching, according to the present invention, is to be avoided by substituting one or more meshes or units of a filter or network having the characteristic impedance of the line or cable and possessing a cut-off frequency lying below the lowest working wave, at those places or points along the line or cable which are characterized by an increase in shunt capacity or series inductance.

A more complete understanding of the present invention may be had by reference to the following detailed description, which is accompanied by a drawing in which Figure 1 illustrates in cross-section a junction between a pair of cable lengths and Figure 2 illustrates the same junction drawn in a schematic form indicating the inductance and capacities of the junction as being lumped.

A simple exemplified embodiment of the said basic idea is illustrated in Figure 1 of the drawing comprising the joints or junctions of two cable lengths at which an increase in the terminating capacity $C_z$ is caused by the provision of a cable head. The assumption shall be made, for instance, that the characteristic impedance $Z_1$ of the cable is 60 ohm. The shortest working wave shall be 14 meters. It will be remembered that if a section of a line or cable is short compared to $\lambda/4$ length the constants thereof may be considered as lumped so that each section may be replaced with great accuracy by a network of lumped capacity and inductance as shown in Figure 2. Each such network mesh may have a length up to 1 m. in the case assumed dealing with a 14 meter wave. Assuming that such a case is dealt with, and that the inside diameter of the outer conductor D is 10 centimeters, that of the inner conductor $d$ is 1 centimeter. Then the characteristic impedance of the intermediate section may be determined by substituting the assumed values in the fundamental equation for the impedance of a concentric line.

(1) $$Z = 60 \log_e \frac{D}{d}$$

or, substituting values we have (2) $$Z_2 = 60 \log_e \frac{10}{1} = 138 \text{ ohms}$$

The intermediate length of line or cable may be considered as a $\pi$ type mesh in which half of the total distributed capacity between the conductors comprises a shunt capacity of the mesh and the inductance of the whole section is the series inductance of the mesh. The values of the $\pi$ type mesh may be determined from the following equations.

Inductance per unit length of a concentric line may be determined from the equation—

(3) $$L = 2 \log_e \frac{D}{d}$$

By substituting the assumed values in this equation for the 1 meter intermediate section—

(4) $L = 100 \times 2 \log_e \frac{10}{1} = 460$ cm., total inductance

The capacity at each end of the $\pi$ type mesh may be determined by substituting in the fundamental equation for capacity per unit length of a concentric line—

(5) $$C = \left(2 \log_e \frac{D}{d}\right)^{-1}$$

Substituting the assumed values in this equation we have (6) $$C = \frac{500}{2 \log_e \frac{10}{1}} = 10.86 \text{ cm.}$$

Now the characteristic impedance of the $\pi$ type mesh constituted by the intermediate section of line may be determined from the following equation in which the inductance and capacity are expressed in terms of centimeters.

(7) $$Z = 30\sqrt{L/C}$$

where C is the sum total of the right- and left-hand side capacities. Hence, transposing this last equation and substituting the value of L and C, obtained from Equations 4 and 6, there may be a total allowable capacity—

(8) $$C = \frac{900 \times L}{Z_1^2} = \frac{900 \times 460}{60^2} = 105 \text{ cm.}$$

in the intermediate section with an impedance of 60 ohms as in the rest of the cable. In other words, the additional capacity $C_2$ for each side and which is to be compensated for may reach the amount—

(9) $\quad C_2 = 52.5 - 10.86 = 41.06$ cm.

and this unquestionably would occur only in exceptional cases If the intermediate section had a length of only 50 centimeters then $C_2$ would have a value of 23.3 centimeters. But even this value would be rather too great than too low; whence it can be inferred that the reduction in the diameter of the inner conductor which for the original cable was about 3 cm. need not at all be pushed that far. But if the characteristic impedance $Z_1$, for a concentric or co-axial cable, is inherently rather high, say, above 120 ohms approximately, a reduction of the inner conductor, within the intermediary piece, would hardly be admissible any more for reasons of current carrying load. Under such circumstances the junction conductor must be made in the form of a coil; and this, under certain conditions, as a consequence of the greater mechanical yieldingness (especially when a flat form of coil is used) would make an additional expansion link dispensable. An increase in the inductance of the inner conductor under certain circumstances could be secured also by adopting a cage-type structure, that is, by paralleling of single wires, which also inherently has the advantage of mechanical flexibility.

I claim:

1. A sectional concentric line comprising a casing and an inner conductor and having a predetermined characteristic impedance, said line having at least one joint therein joining adjacent sections of said line, insulating supporting means for said inner conductor at each end of said joint, each of said supporting means causing a localized increase in capacity between said inner conductor and outer casing, said joint comprising a shell section connecting adjacent sections of said casing and an inductance connecting adjacent sections of said inner conductor, said inductance being so related to said increases in capacity that the characteristic impedance of said joint is equal to that of said line.

2. A sectional concentric line comprising a casing and an inner conductor and having a predetermined characteristic impedance, said line having at least one joint therein joining adjacent sections of said line, insulating supporting means for said inner conductor at each end of said joint, each of said supporting means causing a localized increase in capacity between said inner conductor and outer casing, said joint comprising a shell section connecting adjacent sections of said casing and an inductance connecting adjacent sections of said inner conductor, said inductance being so related to said increases in capacity that the characteristic impedance of said joint is equal to that of said line, said joint having a length which is small compared to a quarter of the length of the operating wave.

3. A sectional concentric transmission line comprising a tubular casing and an inner conductor, the diameter of said inner conductor being so related to the diameter of said casing as to provide a predetermined characteristic impedance, said line having at least one joint therein joining adjacent sections of said line, insulating supporting means for said inner conductor at each end of said joint, each of said supporting means causing a localized increase in capacity between said inner conductor and outer casing, said joint comprising a shell section connecting adjacent sections of said outer casing and a central conductor section connecting adjacent sections of said inner conductor and having a diameter smaller than that of said inner conductor, the difference in diameter being so related to said increases in capacity that the characteristic impedance of said joint is equal to that of said transmission line.

4. A sectional concentric transmission line comprising a tubular casing and an inner conductor, the diameter of said inner conductor being so related to the diameter of said casing as to provide a predetermined characteristic impedance, said line having at least one joint therein joining adjacent sections of said line, insulating supporting means for said inner conductor at each end of said joint, each of said supporting means causing a localized increase in capacity between said inner conductor and outer casing, said joint comprising a shell section connecting adjacent sections of said outer casing and a central conductor section connecting adjacent sections of said inner conductor and having a diameter smaller than that of said inner conductor, the difference in diameter being so related to said increases in capacity that the characteristic impedance of said joint is equal to that of said transmission line, and said joint having a length which is not more than one twelfth of the length of the operating wave.

WERNER BUSCHBECK.